United States Patent
Kurata et al.

(10) Patent No.: US 10,152,507 B2
(45) Date of Patent: Dec. 11, 2018

(54) FINDING OF A TARGET DOCUMENT IN A SPOKEN LANGUAGE PROCESSING

(71) Applicant: INTERNATIONAL BUSINESS MACHINES CORPORATION, Armonk, NY (US)

(72) Inventors: Gakuto Kurata, Tokyo (JP); Masayuki A. Suzuki, Tokyo (JP); Ryuki Tachibana, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 15/077,260

(22) Filed: Mar. 22, 2016

(65) Prior Publication Data

US 2017/0278508 A1   Sep. 28, 2017

(51) Int. Cl.
  *G06F 17/27* (2006.01)
  *G06F 17/30* (2006.01)
  *G10L 15/26* (2006.01)

(52) U.S. Cl.
  CPC ........ *G06F 17/30401* (2013.01); *G10L 15/26* (2013.01)

(58) Field of Classification Search
  None
  See application file for complete search history.

(56) References Cited

U.S. PATENT DOCUMENTS

| | | | |
|---|---|---|---|
| 6,167,377 A * | 12/2000 | Gillick | G10L 15/063 704/240 |
| 7,451,089 B1 | 11/2008 | Gupta et al. | |
| 7,809,568 B2 | 10/2010 | Acero et al. | |
| 8,831,944 B2 | 9/2014 | Bangalore et al. | |
| 2002/0116174 A1* | 8/2002 | Lee | G06F 17/30707 704/9 |
| 2004/0044952 A1* | 3/2004 | Jiang | G06F 17/30616 715/256 |
| 2008/0071744 A1* | 3/2008 | Yom-Tov | G06F 17/30696 |
| 2011/0224982 A1 | 9/2011 | Acero et al. | |
| 2014/0249816 A1 | 9/2014 | Pickering et al. | |

OTHER PUBLICATIONS

Fang, H. et al., "An Exploration of Axiomatic Approaches to Information Retrieval," SIGIR'05, Aug. 2005. (pp. 480-487).

(Continued)

*Primary Examiner* — Kevin Ky
(74) *Attorney, Agent, or Firm* — Tutunjian & Bieto, P.C.; Vazken Alexanian

(57) ABSTRACT

Methods and systems are provided for finding a target document in spoken language processing. One of the methods includes calculating a score of each document in a document set, in response to a receipt of first n words of output of an automatic speech recognition (ASR) system, n being equal or greater than zero. The method further includes reading a prior distribution of each document in the document set from a memory device, and updating, for each document in the document set, the score, using the prior distribution, and a weight for interpolation, the weight for interpolation being set based on a confidence score of output of the ASR system. The method additionally includes finding a target document among the document set, based on the updated score of each document.

20 Claims, 5 Drawing Sheets

(56) References Cited

OTHER PUBLICATIONS

Hazen, T.J. et al., "Recognition Confidence Scoring for Use in Speech Understanding Systems" Computer Speech & Language vol. 16, No. 1, Jan. 2002. (pp. 1-8).
Lu, D. et al., "Decision of response timing for incremental speech recognition with reinforcement learning" IEEE Workshop on Automatic Speech Recognition and Understanding, Dec. 2011. (pp. 467-472).
Robertson, S.E. et al., "Some Simple Effective Approximations to the 2-Poisson Model for Probabilistic Weighted Retrieval," SIGIR '94 Proceedings of the 17th annual international ACM SIGIR conference on Research and development in information retrieval, Aug. 1994. (pp. 1-10).
Stroembergsson, S. et al., "Timing responses to questions in dialogue" Interspeech, Aug. 2013. (pp. 1-5).

\* cited by examiner

|  | without artificial errors | | with artificial errors | |
| --- | --- | --- | --- | --- |
|  | 1-best | 10-best | 1-best | 10-best |
| α=0.10 (tuned for ASR results without artificial errors) | 32.0% | 45.3% | 24.7% | 44.0% |
| α=0.06 (tuned for ASR results with artificial errors) | 30.0% | 45.3% | 25.3% | 44.7% |

FIG. 5

FINDING OF A TARGET DOCUMENT IN A SPOKEN LANGUAGE PROCESSING

BACKGROUND

Technical Field

This invention relates to a spoken language processing and, more specifically to a technique for finding a target document in a spoken language processing.

Description of the Related Art

Spoken Language Processing (SLP) refers to technologies related to automatic speech recognition and natural language processing.

In a real-time SLP system, it is preferable to obtain appropriate results based on automatic speech recognition prior to end of speech.

SUMMARY

According to one aspect of the present invention, an embodiment of the present invention provides a computer-implemented method for finding a target document in a spoken language processing. The method comprises calculating a score of each document in a document set, in response to a receipt of first n words of output of an automatic speech recognition (ASR) system, n being equal or greater than zero; reading a prior distribution of each document in the document set from a memory device; updating, for each document in the document set, the score, using the prior distribution and a weight for interpolation, the weight for interpolation being calculated based on a confidence score of output of the ASR system; and finding a target document among the document set, based on the updated score of each document.

According to another aspect of the present invention, a system such as a computer system comprising a computer readable storage medium storing a program of instructions executable by the system to perform one or more methods described herein may be provided.

According to another aspect of the present invention, a computer program product comprising a computer readable storage medium storing a program of instructions executable by the system to perform one or more methods described herein also may be provided.

BRIEF DESCRIPTION OF THE DRAWINGS

FIG. 5 illustrates a result obtained according to one embodiment of the present invention.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
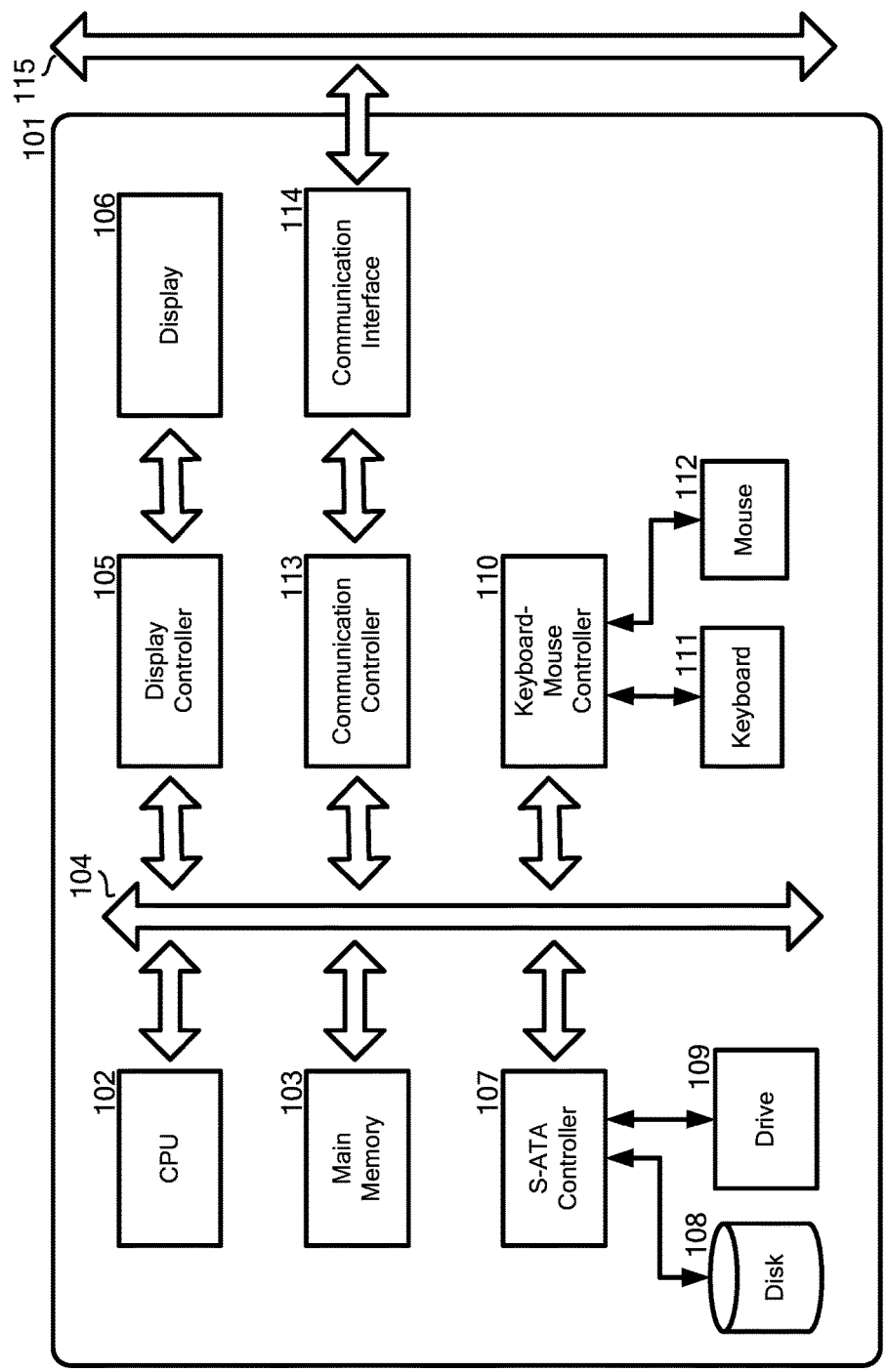
FIG. 1 illustrates an example of a basic block diagram of a computer hardware used in an embodiment of the present invention.

With reference now to FIG. 1, FIG. 1 illustrates an example of a basic block diagram of a computer hardware used in an embodiment of the present invention.

A computer (101) may be, for example, but is not limited to, a desktop, a laptop, a notebook, a tablet, a smartphone, a mobile phone or a server computer. The server computer may be, for example, but is not limited to, a workstation, a rack-mount type server, a blade type server, or a mainframe server and may run, for example, a hypervisor for creating and running one or more virtual machines. The computer (101) comprises one or more CPUs (102) and a main memory (103) connected to a bus (104). The CPU (102) is preferably based on a 32-bit or 64-bit architecture. The CPU (102) is, for example, but is not limited to, the Power® series of International Business Machines Corporation; the Core i™ series, the Core 2™ series, the Atom™ series, the Xeon™ series, the Pentium® series, or the Celeron® series of Intel Corporation; or the Phenom™ series, the Athlon™ series, the Turion™ series, or Sempron™ of Advanced Micro Devices, Inc. ("Power" is registered trademark of International Business Machines Corporation in the United States, other countries, or both; "Core i", "Core 2", "Atom", and "Xeon" are trademarks, and "Pentium" and "Celeron" are registered trademarks of Intel Corporation in the United States, other countries, or both; "Phenom", "Athlon", "Turion", and "Sempron" are trademarks of Advanced Micro Devices, Inc. in the United States, other countries, or both).

A display (106) such as a liquid crystal display (LCD) may be connected to the bus (104) via a display controller (105). The display (106) may be used to display, for management of the computer(s), information on a computer connected to a network via a communication line and information on software running on the computer using an appropriate graphics interface. A disk (108) such as a hard disk or a solid state drive, SSD, and a drive (109) such as a CD, a DVD, or a BD (Blu-ray disk) drive may be connected to the bus (104) via an SATA or IDE controller (107). Moreover, a keyboard (111) and a mouse (112) may be connected to the bus (104) via a keyboard-mouse controller (110) or USB bus (not shown).

An operating system, programs providing Windows®, UNIX® Mac OS®, Linux®, or a Java® processing environment, Java® applications, a Java® virtual machine (VM), and a Java® just-in-time (JIT) compiler, such as J2EE®, other programs, and any data are stored in the disk (108) to be loadable to the main memory. ("Windows" is a registered trademark of Microsoft corporation in the United States, other countries, or both; "UNIX" is a registered trademark of the Open Group in the United States, other countries, or both; "Mac OS" is a registered trademark of Apple Inc. in the United States, other countries, or both; "Linux" is a registered trademark of Linus Torvalds in the United States, other countries, or both; and "Java" and "J2EE" are registered trademarks of Oracle America, Inc. in the United States, other countries, or both).

The drive (109) may be used to install a program, such as the computer program of an embodiment of the present invention, readable from a CD-ROM, a DVD-ROM, or a BD to the disk (108) or to load any data readable from a CD-ROM, a DVD-ROM, or a BD into the main memory (102) or the disk (108), if necessary.

A communication interface (114) may be based on, for example, but is not limited to, the Ethernet® protocol. The communication interface (114) may be connected to the bus (104) via a communication controller (113), physically connects the computer (101) to a communication line (115), and may provide a network interface layer to the TCP/IP communication protocol of a communication function of the operating system of the computer (101). In this case, the communication line (115) may be a wired LAN environment or a wireless LAN environment based on wireless LAN connectivity standards, for example, but is not limited to, IEEE® 802.11a/b/g/n ("IEEE" is a registered trademark of Institute of Electrical and Electronics Engineers, Inc. in the United States, other countries, or both).

Hereinafter, an embodiment of the present invention will be described with reference to the following FIGS. 2, 3 and 4.

As stated above, it is preferable to response to an inquiry before end of speech, such as call in the telephone conversations between call agent and customer. If no words are recognized, it is reasonable to use a prior distribution of the target documents for obtaining a target document.

The idea of an embodiment of the present invention is on the basis of a perception that a combination of the prior distribution and the scores of each document in the document set which are calculated only using first some recognized words at that time may be useful to obtain a better target document in order to response to an inquiry before end of speech.

Figure 2:
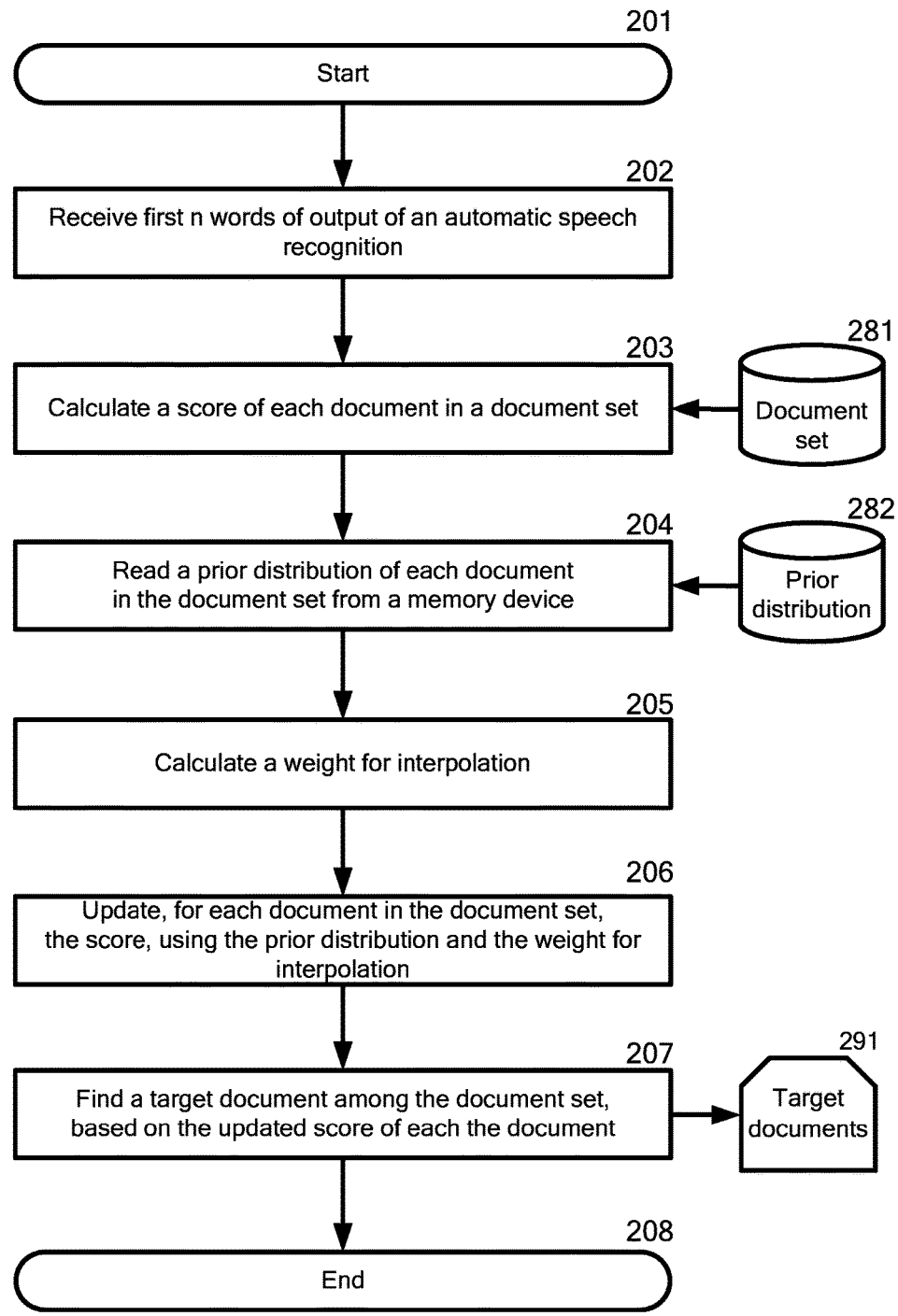
FIG. 2 illustrates one embodiment of a flowchart of a process for finding a target document in a spoken language processing, according to an aspects of the present invention.

With reference now to FIG. 2, FIG. 2 illustrates one embodiment of a flowchart of a process for finding a target document in a spoken language processing.

A system such as the computer (101) performs each process described in FIG. 2. The system may be implemented as a single computer or plural computers.

In step 201, the system starts the process mentioned above. The process is performed in a test time. The test time means that the process is performed in a situation where speeches are now being made, for example, between an agent and a customer.

In step 202, the system receives first n words of output of an automatic speech recognition. The n is equal or greater than zero.

The automatic speech recognition may be performed in the system or another computer other than the system. Any automatic speech recognition method can be used for recognizing speeches. The speeches may be those made by a target speaker, such as an agent in a call center or customer service or any speaker among plural speakers.

The speeches may be made, for example, but not limited to, between an agent and a customer. For example, the speeches from a customer may be used in a situation where the speeches are made in a call center, a customer service, or face to face communications.

The number of n may be determined in advance, for example, ten, twenty, thirty, forty, fifty, . . . , or one hundred and so on. If the number of n is zero, this means that a speech is not being made or a speaker starts to speak but is not speaking one word yet.

In step 203, in response to a receipt of the first n words of output of the ASR, the system calculates a score of each document in a document set. The calculated score may be expressed as score(d|w1, w2, . . . , wn).

The score can be calculated using any method known in the art. For example, the methods, tf-idf (term frequency-inverse document frequency), Okapi-BM25 (BM stands for Best Matching) or BM25F which is a variant of Okapi-BM25 can be used. Such methods are often used for information retrieval. Okapi-BM25 is described in the following reference: S. E. Robertson and S. Walker, "Some simple effective approximations to the 2-poisson model for probabilistic weighted retrieval." In Proc. 17th Ann. Intl. ACM SIGIR Conf. on Research and Development in Information Retrieval, pages 232-241. Springer-Verlag New York, Inc., 1994. F2EXP is described in the following reference: H. Fang and C. Zhai, "An exploration of axiomatic approaches to information retrieval" In Proc. 28th Ann. Intl. ACM SIGIR Conf. on Research and Development in Information Retrieval, pages 480-487, 2005.

The system may obtain scores as a posterior distribution by training a classifier such as logistic regression.

In step 204, the system reads a prior distribution of each document in the document set from a memory device (282), such as a hard disk (106) or a storage area network. The prior distribution may be expressed as prior(d).

The prior distribution is calculated according to any method known in the art and then stored in the memory device (282) prior to start the process described in FIG. 2.

The prior distribution of documents, d, can be expressed as "prior(d)". The prior distribution of documents, d, is based on an assumption that some documents are often referred to but some documents are not referred to.

In step 205 the system calculates a weight for interpolation.

The calculated weight for interpolation will be used in the next step 206 where the scores calculated in step 203 are updated. The weight for interpolation may be used as seen in the following formula (1) which is used in the next step 206.

$$(1-\alpha)*\text{score}(d|w1,w2,\ldots,wn)+\alpha*\text{prior}(d) \qquad (1)$$

where α denotes a weight for interpolation between the score and the prior distribution.

The weight for interpolation as shown in following (1) or (2) may be used, according to one embodiment of the present invention.

(1) The weight for interpolation may be calculated only based on a confidence score of output of the ASR.

In one embodiment, the confidence score of output of the ASR may be a confidence score for all of the words recognized by the ASR at the time of receipt of the first n words.

In another embodiment, the confidence score of output of the ASR may be a confidence score of each word in the recognized words. In one method, the confidence score can be calculated by summing up the confidence score of each word. In another method, the confidence score can be calculated depending on kinds of word.

In both embodiments, the ASR may output the confidence score with the recognized words.

When the weight, α, for interpolation can be expressed using g(n, c), g(n, c) may be made so as to optimize SLP (spoken language processing) accuracy. In α=g(n, c), n denotes the number of recognized words and c denotes a confidence score of output of the ASR. The SLP accuracy can be measured by using validation data and the g(n, c) can be optimized so that SLP accuracy becomes high.

For example, when g(n, c)=f(n)*h(c) is defined, a function f(n) which is inversely proportional to n and a function h(c) which is inversely proportional to c are selected.

For example, the weight for interpolation may be given by a following linear conversion formula (2).

Weight for interpolation=$A$×(a confidence score of output of the ASR)+$B$ (2)

where A and B each are any parameter. The A and B may be a weight or bias used in the linear conversion formula, respectively.

The weight or bias in the linear conversion formula (2) may be determined so as to maximize a performance score of the validation data.

(2) The weight for interpolation may be calculated based on the confidence score and at least one of a signal-to-noise ratio (SNR), a speed of speech, the number of recognized words in a word list and an entropy of the score of the document generated without using the prior distribution.

The SNR may be calculated using any method known in the art. The SNR may be obtained from the ASR. The SNR may vary according to surrounding environment of a speaker.

The speed of speech may be using any method known in the art. The speed of speech may be obtained from the ASR. The speed of speech may vary depending on a target speaker, such as an agent in a call center or customer service or any speaker among plural speakers.

The number of recognized words in a word list is the number of words recognized by the ASR. The word list may be an important word list in a domain where the ASR is used. The word list may be determined in advance, according to a field of, for example, business affairs of an agent. The number of recognized words may be obtained from the ASR. The number of recognized words may vary according to a performance ability of the ASR.

The entropy of the score of the document may be calculated using any method known in the art. The entropy may vary depending on the recognized words.

In further another embodiment, the weight for interpolation may be determined by dividing the confidence score into predetermined windows and then determine each weight for interpolation in each window so as to be highest in an accuracy of the validation data.

A calculation formula of the weight for interpolation may be determined dynamically during the process described in FIG. 2.

In step 206, the system updates, for each document in the document set, the score calculated in step 203, using the prior distribution and weight for interpolation.

The formula (1) mentioned above can be used for updating the score, using the prior distribution and the weight for interpolation.

$(1-\alpha)$*score$(d|w1,w2,\ldots,wn)+\alpha$*prior$(d)$ (3)

where a denotes a weight for interpolation between the score and the prior distribution.

The weight, $\alpha$, can be dynamically calculated and updated during the process, depending on a parameter for calculating a weight for interpolation.

The formula (3) represents a updated score of each document, d, when first n words of output, w1, w2, . . . , wn, of an ASR, where n≥0. The formula (3) represents a situation where we can obtain n words (1, w2, . . . , wn) when the ASR system outputs end of speech (EOS), but we want to select appropriate documents only using first n words in this situation.

The confidence score may be (1) a confidence score for all of the words recognized by the ASR which is output together with the plurality of words recognized by the ASR; or (2) a confidence score of a word in the words recognized by the ASR which is output together with the words recognized by the ASR.

In step 207, the system finds one or more target documents among the document set, based on the updated score of each document. The system may find the predetermined number of target documents among the document set.

The found target document may be, for example, but not limited to, a document file, an image file, a voice file, a video file, or a file which records one or more actions for a speech dialog.

In one embodiment, the system may display, on a display (106), the found one or more target documents, display corresponding file names of the found one or more target documents or make an action based on a file which records an action for a speech dialog.

In another embodiment, the system may transmit the one or more target documents to a computer used by an agent in order to display the one or more target documents on a display used by the agent, display corresponding file names of the found one or more target documents or make an action based on a file which records an action for a speech dialog.

In step 208, the system terminates the process mentioned above.

An embodiment of the process mentioned above enable the system to obtain appropriate results before end of user's speeches.

Figure 3:
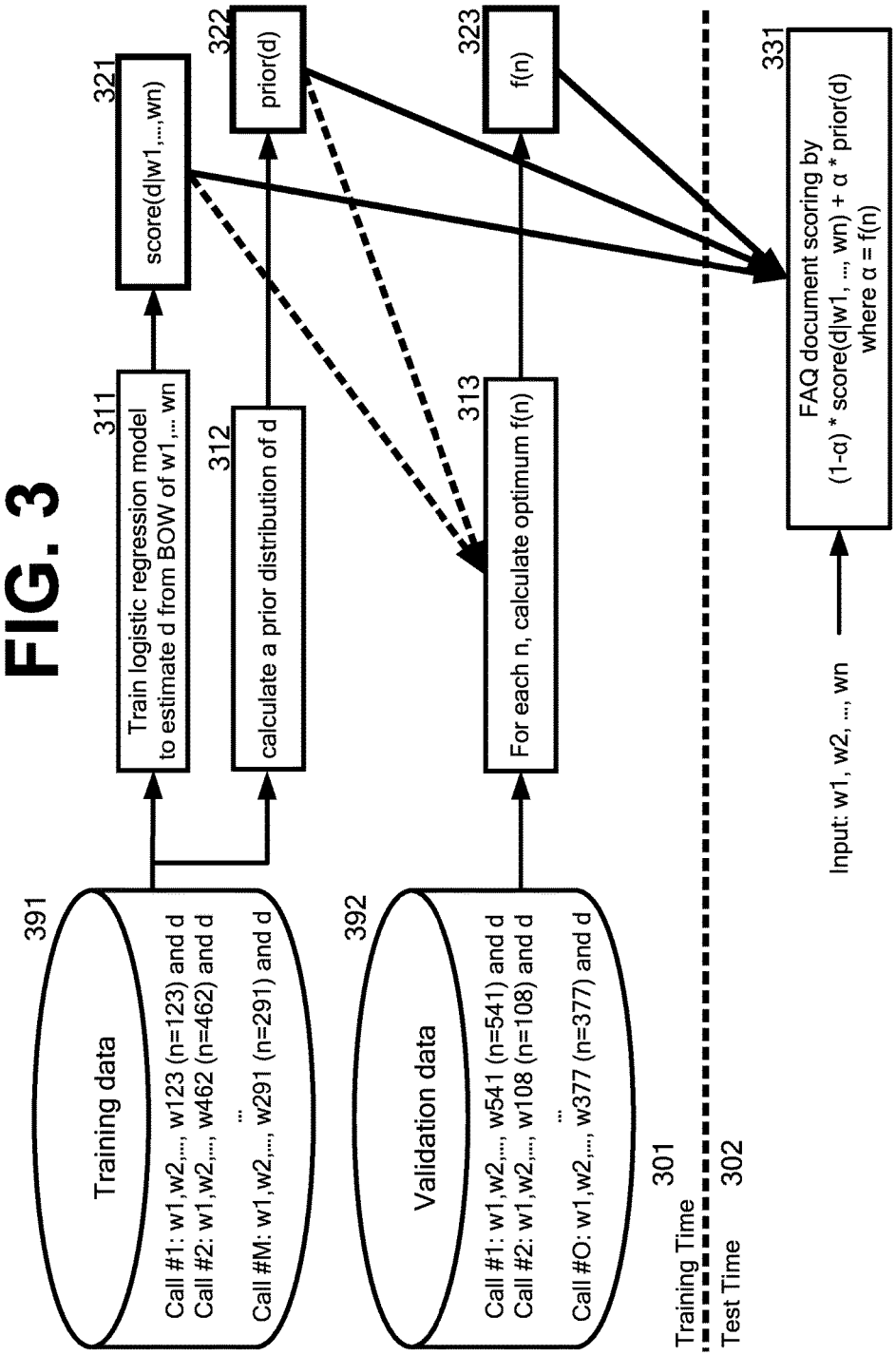
FIG. 3 illustrates one embodiment of a diagram of a training time and a test time, according to aspects of the present invention.

With reference now to FIG. 3, FIG. 3 illustrates one embodiment of a diagram of a training time (301) and a test time (302).

FIG. 3 describes a situation where the training time (301) and test time (302) is performed.

The training time (301) means that training process such as a training of a logistic model is performed prior to start the process described in FIG. 2. As stated above, the test time (302) means that the process is performed in a situation where speeches are now being made, for example, between an agent and a customer.

The process performed in the training process will be described below.

The training data (391) and validation data (392) is prepared by, for example, dividing recorded log data into training data (391) and validation data (392). The training data (391) comprises records a plurality of call logs, such as calls #1 to M, where M denotes an integer. Similarly, the validation data (392) comprises records a plurality of call logs, such as calls #1 to O, where O denotes an integer. The calls #1 to M may be different from calls #1 to O.

In step 311, the system trains logistic regression model using the training data (391) to estimate scores for documents as posterior distribution from bag-of-words (BOW) of w1, . . . , wn. In step 321, the score of target documents d, score(d|w1, . . . , wn) (321), is calculated. The score (d|w1, . . . , wn) (321) will be also dynamically estimated during the test time (302).

In step 312, the system calculates a prior distribution of the target documents d, using the training data (391). In step 322, the calculated prior distribution, prior(d), is stored in a memory device, such as a disk (108) described in FIG. 1.

In step 313, the system calculates a weight, for interpolation, only based on a confidence score of output of the ASR. Alternatively, the system calculates a weight for interpolation, based on the confidence score and at least one of a signal-to-noise ratio (SNR), a speed of speech, the number of recognized words in a word list and an entropy of the score of the document generated without using the prior distribution.

The process performed in the test time (302) will be described below.

In step 331, the system reads the calculated weight, f(n), for interpolation. The system then updates the score, using the prior distribution (322) and the weight, f(n), for interpolation, in response to a receipt of first n words of output of an ASR. Next, the system updates, for each of the target documents, the score by $(1-\alpha)*\text{score}(d|w1, w2, \ldots, wn)+\alpha*\text{prior}(d)$, where $\alpha=f(n)$. The system finds one or more target documents among the document set, based on the updated score of each document.

Figure 4:
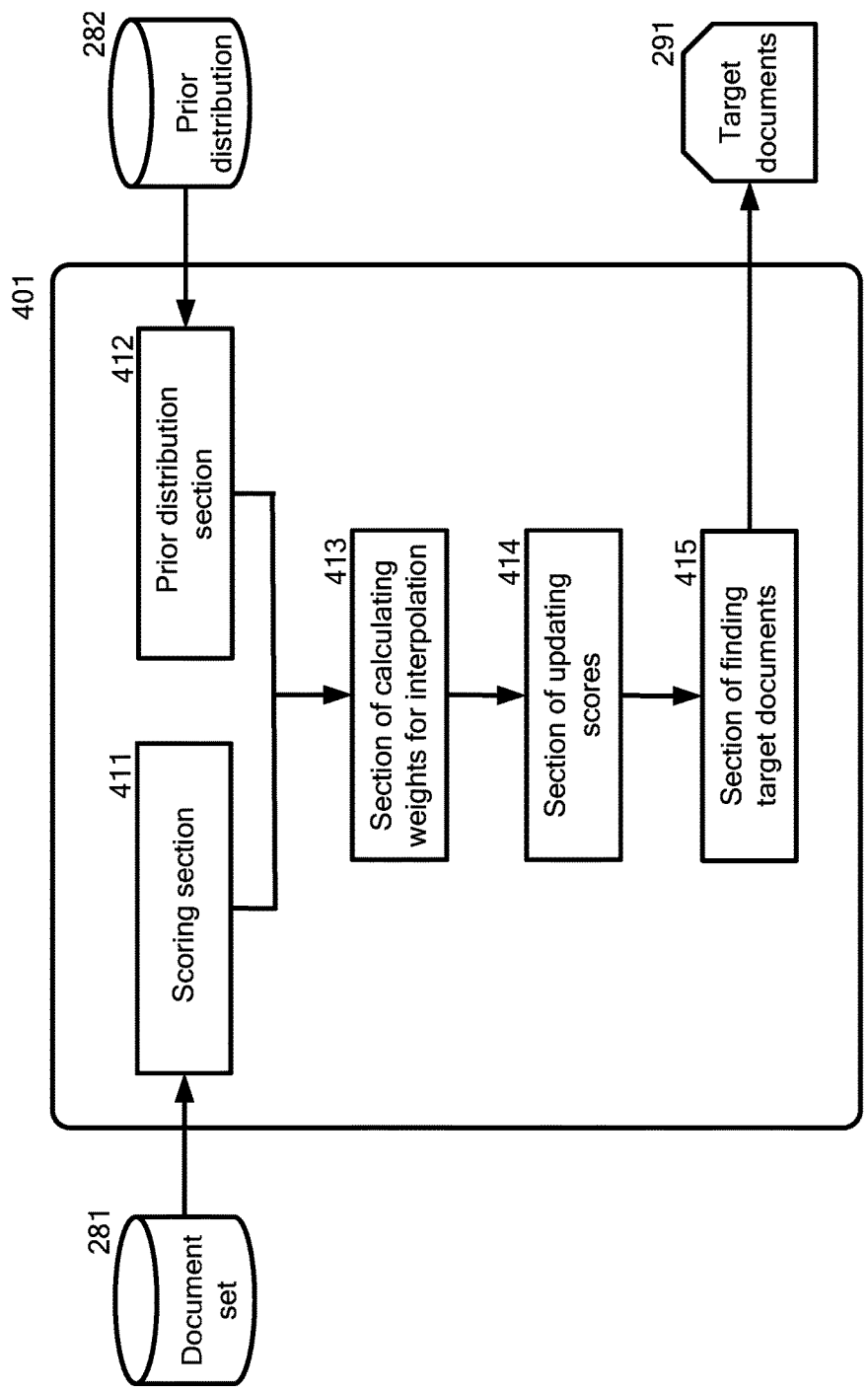
FIG. 4 illustrates one embodiment of an overall functional block diagram of a system hardware used in an embodiment of the present invention.

With reference now to FIG. 4, FIG. 4 illustrates one embodiment of an overall functional block diagram of a system hardware used in an embodiment of the present invention.

The system (401) may correspond to the computer (101) described in FIG. 1.

The system (401) comprises a scoring section (411), a prior distribution section (412), a section of calculating weights for interpolation (413), a section of calculating scores (414) and a section of finding target documents (415).

The scoring section (411) reads a document set from the storage (281) and then calculates a score of each document in the document set, in response to a receipt of first n words of output of an automatic speech recognition (ASR). n is equal or greater than zero.

The scoring section (411) may perform steps 202 and 203 described in FIG. 2. The scoring section (411) may further perform steps 311 and 321 described in FIG. 3.

The prior distribution section (412) reads a prior distribution of the documents from a memory device (282).

The prior distribution section (412) may perform step 204 described in FIG. 2. The prior distribution section (412) may further perform steps 312 and 322.

The section of calculating weights for interpolation (413) calculates a weight for interpolation.

The section of calculating weights for interpolation (413) may perform step 205 described in FIG. 2. The section of calculating weights for interpolation (413) may further perform steps 313 and 323.

The section of updating scores (414) updates, for each document in the document set, the score of each document in the document set, using the prior distribution and a weight for interpolation. The weight for interpolation is calculated based on a confidence score of output of the ASR.

The section of updating scores (414) may perform step 206 described in FIG. 2.

The section of finding target documents (415) finds one or more target documents (291) among the document set, based on the score of each documents.

The section of finding target documents (415) may perform step 207 described in FIG. 2.

With reference now to FIG. 5, FIG. 5 illustrates a result obtained according to one embodiment of the present invention.

The purpose of the following working example is to know that when the weight, $\alpha$, for interpolation is calculated based on a confidence score of output of the ASR, how the accuracy gain will be changed.

We did experiments to find, using ASR error rates, optimal weight, $\alpha$, for interpolation. The ASR error rates have high correlation to confidence scores of the ASR system. Accordingly, these experiments can indirectly confirm effects of confidence scores.

The task in the working example is to estimate relevant FAQ documents from the ASR results in a call agent.

The following data was prepared: 274 training data, 150 validation data and 150 test data. Each data was obtained as the ASR results in a call agent which have the first to the final speeches. The average number of the words in one call is 636 words.

For the test data, artificial errors were added to the test data and the test data with artificial errors was further prepared.

The following procedures were used for the working example.

1. Train logistic regression model (score) using the training data.

2. Find $\alpha$ so that $(1-\alpha)*\text{score}(d|w1, w2, \ldots, w10)+\alpha*\text{prior}(d)$ has the best accuracy on the validation data. The found a is 0.10 and 0.06.

3. Calculate 1-best and 10-best accuracy, using the test data without artificial errors and the test data with artificial errors.

Table 1 (501) shows the 1-best and 10-best accuracy, using the test data without artificial errors and the test data with artificial errors. For the test data without artificial errors, the correct answer rate of $\alpha$ being 0.10 was equal or better than that of $\alpha$ being 0.06. For the test data with artificial errors, the correct answer rate of a being 0.06 was better than that of a being 0.10. Therefore, a depending on the ASR error rates has accuracy gain. Accordingly, the result applies also to situation where a weight, $\alpha$, for interpolation is calculated based on a confidence score of output of the ASR.

The present invention may be a method, a system, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

By the expression "a/one" should be understood as "at least one".

By the expression "comprise(s)/comprising a/one" should be understood as "comprise(s)/comprising at least one".

By the expression "comprise(s)/comprising" should be understood as "comprise(s)/comprising at least".

By the expression "/" should be understood as "and/or".

The invention claimed is:

1. A computer-implemented method for finding a target document in a spoken language processing, the target document extracted in real-time during a verbal exchange between a first entity and a second entity via a communication device, the method comprising:
   creating a log file having log data related to the verbal exchange between the first entity and the second entity via the communication device, the log data including training data and validation data, where the validation data and the training data includes a plurality of call logs, the call logs being different for each call log data set between the validation data and the training data;
   calculating, before the verbal exchange ends, using a processor, a score of each document in a document set, in response to receiving first n words from the real-time verbal exchange between the first entity and the second entity via an automatic speech recognition (ASR) system, wherein n is greater than or equal to 0;
   storing the score of each document in the document set in a document score database;
   reading a prior distribution of each document in the document set from a memory device;
   updating, for each document in the document set, the score, using the prior distribution and a weight for interpolation, wherein the weight for interpolation is calculated based on a confidence score of output of the ASR system; and
   finding a target document among the document set, before the verbal exchange ends and based on the updated score of each document derived from the training data and the validation data, by examining a subset of the verbal exchange to reduce score computations.

2. The method according to claim 1, wherein a calculation formula of the weight for interpolation is determined in advance, using the validation data.

3. The method according to claim 2, wherein the weight for interpolation is given by a linear conversion formula,

[A×(a confidence score of output of the ASR system)+B], wherein A and B in the linear conversion formula are determined so that a performance score of the validation data is maximum.

4. The method according to claim 1, wherein the weight for interpolation is calculated based on the confidence score and at least one of a signal-to-noise ratio (SNR), a speed of speech, a number of recognized words in a word list and an entropy of a score of a document generated without using the prior distribution.

5. The method according to claim 1, wherein the confidence score is a confidence score for all words recognized by the ASR system, or a confidence score of each word in the words recognized by the ASR system.

6. The method according to claim 1, wherein the confidence score is divided into predetermined windows and the weight for interpolation is determined in each window so as to be highest in an accuracy of the validation data.

7. The method according to claim 1, wherein the target document is a document file, an image file, a voice file, a video file, or a file which records an action for a speech dialog.

8. A system, comprising:
a processor; and
a memory storing a program, which, when executed on the processor, performs an operation for finding a target document in a spoken language processing, the target document extracted in real-time during a verbal exchange between a first entity and a second entity via a communication device, the operation comprising:
creating a log file having log data related to the verbal exchange between the first entity and the second entity via the communication device, the log data including training data and validation data, where the validation data and the training data includes a plurality of call logs, the call logs being different for each call log data set between the validation data and the training data;
calculating, before the verbal exchange ends, a score of each document in a document set, in response to receiving first n words from the real-time verbal exchange between the first entity and the second entity via an automatic speech recognition (ASR) system, wherein n is greater than or equal to 0;
storing the score of each document in the document set in a document score database;
reading a prior distribution of each document in the document set from a memory device;
updating, for each document in the documents, the score, using the prior distribution and a weight for interpolation, wherein the weight for interpolation is calculated based on a confidence score of output of the ASR system; and
finding a target document among the document set, before the verbal exchange ends and based on the updated score of each document derived from the training data and the validation data, by examining a subset of the verbal exchange to reduce score computations.

9. The system according to claim 8, wherein a calculation formula of the weight for interpolation is determined in advance, using the validation data.

10. The system according to claim 9, wherein the weight for interpolation is given by a linear conversion formula, [A×(a confidence score of output of the ASR system)+B], wherein A and B in the linear conversion formula are determined so that a performance score of the validation data is maximum.

11. The system according to claim 8, wherein the weight for interpolation is calculated based on the confidence score and at least one of a signal-to-noise ratio (SNR), a speed of speech, a number of recognized words in a word list and an entropy of a score of a document generated without using the prior distribution.

12. The system according to claim 8, wherein the confidence score is a confidence score for all words recognized by the ASR system, or a confidence score of each word in the words recognized by the ASR system.

13. The system according to claim 8, wherein the confidence score is divided into predetermined windows and the weight for interpolation is determined in each window so as to be highest in an accuracy of the validation data.

14. The system according to claim 8, wherein the target document is a document file, an image file, a voice file, a video file, or a file which records an action for a speech dialog.

15. A computer program product for finding a target document in a spoken language processing, the target document extracted in real-time during a verbal exchange between a first entity and a second entity via a communication device, the computer program product comprising a non-transitory computer readable storage medium having program instructions embodied therewith, the program instructions executable by a computer to cause the computer to perform a method comprising:
creating a log file having log data related to the verbal exchange between the first entity and the second entity via the communication device, the log data including training data and validation data, where the validation data and the training data includes a plurality of call logs, the call logs being different for each call log data set between the validation data and the training data;
calculating, before the verbal exchange ends, a score of each document in a document set, in response to receiving first n words from the real-time verbal exchange between the first entity and the second entity via an automatic speech recognition (ASR) system, wherein n is greater than or equal to 0;
storing the score of each document in the document set in a document score database;
reading a prior distribution of the documents from a memory device;
updating, for each document in the document sets, the score, using the prior distribution and a weight for interpolation, wherein the weight for interpolation is calculated based on a confidence score of output of the ASR system; and
finding a target document among the document set, before the verbal exchange ends and based on the updated score of each document derived from the training data and the validation data, by examining a subset of the verbal exchange to reduce score computations.

16. The computer program product according to claim 15, wherein a calculation formula of the weight for interpolation is determined in advance, using the validation data.

17. The computer program product according to claim 16, wherein the weight for interpolation is given by a linear conversion formula, [A×(a confidence score of output of the ASR system)+B], wherein A and B in the linear conversion formula are determined so that a performance score of the validation data is maximum.

18. The computer program product according to claim 15, wherein the weight for interpolation is calculated based on the confidence score and at least one of a signal-to-noise ratio (SNR), a speed of speech, a number of recognized words in a word list and an entropy of a score of a document generated without using the prior distribution.

19. The computer program product according to claim 15, wherein the confidence score is a confidence score for all words recognized by the ASR system, or a confidence score of each word in the words recognized by the ASR system.

20. The computer program product according to claim 15, wherein the confidence score is divided into predetermined windows and the weight for interpolation is determined in each window so as to be highest in an accuracy of the validation data.

* * * * *